United States Patent [19]

Weibel

[11] Patent Number: 5,487,419

[45] Date of Patent: Jan. 30, 1996

[54] REDISPERSIBLE MICRODENOMINATED CELLULOSE

[75] Inventor: Michael K. Weibel, West Redding, Conn.

[73] Assignee: Microcell, Inc., West Redding, Conn.

[21] Appl. No.: 89,682

[22] Filed: Jul. 9, 1993

[51] Int. Cl.$^6$ .................................................. D21C 9/00
[52] U.S. Cl. ............................. 162/9; 162/100; 162/175; 162/177; 162/178
[58] Field of Search ................................ 162/9, 141, 100, 162/176, 187, 28, 149, 23, 178, 175, 182, 261, 172; 241/21, 28

[56] References Cited

U.S. PATENT DOCUMENTS

| | | |
|---|---|---|
| 238,044 | 2/1881 | Luckenbach et al. . |
| 1,631,834 | 6/1927 | Schorger ................................. 162/187 |
| 2,054,301 | 9/1936 | Richter ................................... 162/187 |
| 2,885,154 | 5/1959 | Du Bois Eastman et al. . |
| 3,023,104 | 2/1962 | Battista . |
| 3,186,648 | 6/1965 | Mandle et al. . |
| 3,467,317 | 9/1969 | Stephanoff . |
| 3,643,875 | 2/1972 | Dille et al. . |
| 3,701,484 | 10/1972 | Donovan . |
| 4,087,317 | 5/1978 | Roberts ................................... 162/187 |
| 4,143,163 | 3/1979 | Hutchison et al. . |
| 4,173,248 | 11/1979 | Roberts ................................... 162/141 |
| 4,216,242 | 8/1980 | Braverman . |
| 4,261,521 | 4/1981 | Ashbrook . |
| 4,269,859 | 5/1981 | Morse . |
| 4,336,370 | 6/1982 | Yasnovsky et al. . |
| 4,341,807 | 7/1982 | Turbak et al. . |
| 4,374,702 | 2/1983 | Turbak et al. . |
| 4,378,381 | 3/1983 | Turbak et al. . |
| 4,385,172 | 5/1983 | Yasnovsky et al. . |
| 4,452,722 | 6/1984 | Turbak et al. . |
| 4,464,287 | 8/1984 | Turbak et al. . |
| 4,481,076 | 11/1984 | Herrick .................................. 162/187 |
| 4,481,077 | 11/1984 | Herrick .................................... 162/9 |
| 4,483,743 | 11/1984 | Turbak et al. . |
| 4,487,634 | 12/1984 | Turbak et al. . |
| 4,500,546 | 2/1985 | Turbak et al. . |
| 4,533,254 | 8/1985 | Cook et al. . |
| 4,543,410 | 9/1985 | Cruz, Jr. . |
| 4,645,606 | 2/1987 | Ashbrook et al. . |
| 4,659,388 | 4/1987 | Innami et al. . |
| 4,680,189 | 7/1987 | Schumacher et al. . |
| 4,692,211 | 9/1987 | Roberts .................................. 162/187 |
| 4,710,390 | 12/1987 | Schumacher et al. . |
| 4,761,203 | 8/1988 | Vinson . |
| 4,764,283 | 8/1988 | Ashbrook et al. . |
| 4,780,321 | 10/1988 | Levy et al. . |
| 4,863,565 | 9/1989 | Johnson et al. . |
| 4,908,154 | 3/1990 | Cook et al. . |
| 5,026,569 | 6/1991 | Forand . |
| 5,073,397 | 12/1991 | Tarr et al. . |

FOREIGN PATENT DOCUMENTS

| | | |
|---|---|---|
| 949464 | 2/1964 | United Kingdom . |
| 1300820 | 12/1972 | United Kingdom . |
| WO9119421 | 12/1991 | WIPO . |
| WO9119423 | 12/1991 | WIPO . |

*Primary Examiner*—Peter Chin
*Attorney, Agent, or Firm*—Dann, Dorfman, Herrell and Skillman

[57] ABSTRACT

A process for the production of and a composition of redispersible mechanically disassembled cellulose and the resultant product, referred to as microdenominated cellulose (MDC). The process is characterized by drying the MDC in the presence of a dispersion agent. The product is characterized by a settled volume of greater than 50%, as determined on the basis of a 1% by weight suspension in water after twenty-four hours, and a water retention value of over 350%. MDC is useful as an ingredient in foods, pharmaceutical and cosmetic products.

10 Claims, No Drawings

REDISPERSIBLE MICRODENOMINATED CELLULOSE

This invention relates to redispersible microdenominated cellulose and to the production of microdenominated cellulose which may be dried and redispersed.

BACKGROUND OF THE INVENTION

Microdenominated cellulose (MDC) is produced from fibrous cellulosic material that has been extensively refined and converted into a dispersed tertiary level of structure, thereby achieving certain desirable properties attendant upon such structural change.

MDC is prepared by repeatedly passing a liquid suspension of fibrous cellulose through a zone of high shear, which is defined by two opposed surfaces, with one of the surfaces rotating relative to the other, under conditions and for a length of time sufficient to render the suspension substantially stable and to impart to the suspension a Canadian Standard Freeness that shows consistent increase with repeated passage of the cellulose suspension through the zone of high shear.

The production of MDC can be efficiently carried out using standard refining equipment, e.g. a double disk refiner, operated in a way differing from the conventional use of this equipment in refining pulp for paper manufacture. Whereas paper manufacture calls for minimum damage to the fiber during refining and a Canadian Standard Freeness consistent with good drainage of water from the pulp, the same equipment is used to achieve the opposite effect in preparing MDC, i.e., a high degree of disintegration of the fiber structure, which results in a cellulose product having very high surface area and high water absorbency. The degree of disintegration is sufficiently severe that, as refining continues beyond that level normally used for paper manufacture (a Canadian Standard Freeness value approximating 100), a reversal of the Canadian Standard Freeness values occurs. The reason for this reversal is that the dispersed fiber becomes sufficiently microdenominated that gradually greater amounts of fiber begin to pass through the perforated plate of the Canadian Standard Freeness tester with water, thus leading to a progressive increase in the measured value as refining continues. Continuation of refining ultimately results in essentially all of the refined fiber readily passing through the perforated plate with water. At this stage of processing, the measured Canadian Standard Freeness value is typical of that for unimpeded passage of water through the perforated plate of the test unit.

Whereas a single stage, and at most two stages are used for conventional refiner processing in paper manufacture, the process of this invention requires multiple passages of the pulp through the zone of high shear, which may typically involve ten to forty passages.

In paper manufacture beating or refining increases the area of contact between dispersed fibers by increasing the surface area through dispersion and fibrillation. MDC manufacture applies and extends such processing to a much greater degree. It is believed that the extent of refinement needed to achieve this high degree of fibrillation leads to a concomitant disassembly of tertiary structure, and perhaps even secondary structure. The result is an ultrastructurally dispersed form of cellulose with very high surface area.

The product of the invention, MDC, is characterized by a settled volume greater than about 50% after twenty-four hours, as based on 1% by weight aqueous suspension, and water retention greater than about 500%. Procedures for determining the settled volume and water retention values of MDC are described in detail below. Details regarding the preparation of microdenominated cellulose (MDC) are set forth in our copending U.S. patent application Ser. No. 08/089,683, filed Jul. 9, 1993 entitled "Process for Making Microdenominated Cellulose" in the names of Michael K. Weibel and Richard S. Paul, which is commonly owned and filed concurrently with the present application. The entire disclosure of the aforesaid related application is incorporated in the present specification by reference as if set forth herein in full. Because the extent to which it is refined, MDC has a highly fibrillated structure resulting in a very high surface area and the ability to form stable gels. Many of the uses contemplated for MDC in food, pharmaceutical, cosmetics, and the like are best served by providing MDC as a dried product that can be readily rehydrated and redispersed, whereby it exhibits properties approximating those of never dried MDC, i.e. MDC as discharged from the refiner or prior to drying. Unfortunately, this favorable structure and the desirable properties associated therewith are lost or greatly diminished upon drying the material. This occurs as a result of a partially irreversible collapse of the structure of the cellulose fibers due to shrinkage forces exerted during drying (hornification). The favorable dispersibility, hydration and viscosity properties of MDC are lost or substantially modified depending on the severity of drying.

A number of techniques have been developed heretofore to avoid or substantially lessen the adverse effects of drying on cellulose. They include, among others, the use of additives, solvent replacement of water and modified drying techniques. The latter two approaches are described in U.S. Pat. No. 3,023,104. Water can be displaced by a water miscible organic compound of low molecular weight such as methanol, ethanol, propanol, etc. followed by evaporation of the displacement fluid. Modified drying methods include spray drying in vacuum or air up to 100 to 105 degrees Centigrade, freeze drying and drum drying.

Most additives are intended to prevent drying stress or hornification by inhibiting hydrogen bonding of the cellulose fibrils. As disclosed in U.S. Pat. No. 4,481,076, the additive forms hydrogen bonds or complexes with the cellulose fibrils and prevents them from bonding to each other during drying; thus, the cellulose fibrils remain readily accessible to water and easily rehydrated. To perform this function the additive must be capable of substantially inhibiting the hydrogen bonding between the fibrils of the cellulose. Among the compounds found as useful additives are polyhydroxy compounds including particularly carbohydrates or carbohydrate-like compounds. These additive compounds must be used in substantial quantities, generally at least one half of the dried weight of the microfibrillated cellulose and preferably at least equal to microfibrillated cellulose weight in order to achieve the desired effect.

SUMMARY OF THE INVENTION

It is a primary object of this invention to provide dry microdenominated cellulose that can be readily redispersed in water and exhibit properties after redispersion that are essentially equivalent to those of never dried microdenominated cellulose.

The foregoing and other objects of this invention are realized by a process of microdenominating cellulose in liquid suspension, drying the suspension of microdenominated cellulose in the presence of at least one dispersion agent which is believed to function by reducing or preventing bonding between the fibrils of cellulose. The resultant product is a composition comprising the dry, microdenominated cellulose and the dispersion agent in an amount effective to impart to the cellulose a viscosity, when redispersed in water, that is at least fifty per cent of the viscosity of the equivalent concentration of never dried microdenominated cellulose.

DETAILED DESCRIPTION OF THE INVENTION

The starting material for producing MDC is conveniently prepared by beating cellulosic sheet material in a hydrobeater in the presence of a suitable liquid, which disintegrates the sheet material and uniformly disperses the fibers in the liquid.

The exact amount of refining time required to produce MDC depends on the characteristics of the starting material e.g. the fiber length, the temperature of refining and the solids concentration in the pulp. The length of processing is also influenced by the parameters of the shear zone in which the cellulose suspension is processed. In the case of a double disk refiner, these parameters include the amount of back pressure exerted on the cellulose suspension as it is subjected to shear stress during refining, the refiner plate surface configuration, the space between confronting refiner plates, refiner plate diameter and plate peripheral speed. Efficiency is enhanced by operation at high pulp solids concentration, an elevated back pressure on the pulp during refining, elevated pulp temperatures coupled with maximum temperature control, adjustment of the gap between confronting refiner plates by keying on a pre-selected value of amperage to the refiner motor and a refiner plate configuration and peripheral speed that promotes "rubbing" or fraying rather than cutting. Although refining proceeds most efficiently as the solids concentration in the pulp is increased, however, there is a limit to how high the solids concentration can be and still have the pulp flow through the system. A short-fibered material like oat can be concentrated to almost twice the solids concentration possible with softwood and wheat, both long-fibered materials.

Preferred operating conditions for preparation of MDC in a double disk refiner are as follows: fiber length of about 50 to 3000 microns, or greater; refining temperature of about 60° F. to about 200° F.; a solids concentration of about 2 to about 10% by weight of the cellulose suspension; and back pressure of about 10 to about 40 psi.

The remaining parameters, including plate configurations, spacing between adjacent plates, plate diameter and peripheral plate speed will depend on the particular model of refiner selected to process the MDC. A typical run employing a Black Clawson 28-inch Twin Hydradisc refiner is exemplified below.

A primary indicator used to monitor the extent of refining of the cellulosic material is the Canadian Standard Freeness value as measured using test equipment and procedures contained in TAPPI 227 "Freeness of Pulp" J. Casey, *Pulp and Paper* (1980). Freeness has been shown to be related to the surface conditions and the swelling of fiber which influences drainage. As refining continues beyond levels normally practiced in conventional paper making, the dimensions of the resulting structures become sufficiently small such that a reversal of freeness values occurs, i.e. increasing rather than diminishing values of freeness as refining continues. This anomalous rise of freeness is referred to herein as "false freeness". Once the reversal occurs and refining continues thereafter, the measured freeness value increases until a maximum value of approximately 800 is reached. At this point the refined material has been rendered sufficiently supple and fine (dimensionally small) that it readily passes through the perforations of the perforated plate of the tester along with the water. In other words, the suspension behaves as though it were fiber-free water of the same total volume as the fiber-containing sample being measured. This is the limiting condition for obtaining meaningful data from freeness measurements. As the cellulose suspension achieves this desired level of freeness, it becomes substantially stable, which is intended to mean that there is no visible segregation of the continuous phase from the disperse phase, even upon standing for a reasonable period of time.

Several other parameters or properties, in addition to Canadian Standard Freeness, serve to characterize MDC.

A parameter useful in the characterization and description of MDC is the settled volume of aqueous dispersions of differing solids content after twenty-four hours of settling. The settled volume of a sample of MDC is determined by dispersing a known weight of cellulose (dry weight basis) in a known amount of water, e.g. in a graduated cylinder. After a prescribed settling time, the volume of the bed of suspended cellulose is measured with reference to the total volume of the continuous aqueous phase. The settled volume is expressed as a percentage of the bed volume to the total volume. From this data the solids concentration in an aqueous dispersion that results in a settled volume that is fifty percent of the original volume can be determined and used to characterize the product. A characteristic of MDC is that a 1% by weight aqueous suspension has a settled volume greater than 50% after twenty-four hours.

Water retention is another parameter for characterizing MDC. Water retention values are determined by employing a pressure filtration apparatus (Baroid Model 301 for low pressure fluid loss control measurements, N. L. Baroid Corporation, Houston, Tex.) routinely used to evaluate drilling fluid properties. A 100 gram aliquot of a nominal 4 to 8% w/w aqueous dispersion of cellulose is loaded into the filter cell chamber, the cell chamber is capped and subjected to 30 psig. pressure from a regulated nitrogen source. The water discharged from the filtration cell chamber is collected and pressure continued for thirty seconds after observation of the first gas discharge. The nitrogen source is then turned off and collection of discharged water continued for one minute or until the gas discharge ceases, whichever event occurs first. Basically the technique employs pneumatic, pressure filtration to remove interstitial water from the particulate phase.

The expressed volume of water is recorded along with the weight of wet cake. The wet cake is then dried for sixteen hours at 95 degrees Centigrade or until a constant weight is recorded. The water retention value is computed as the ratio of (wet cake weight minus the dry cake weight) to (dry cake weight) times 100. This technique provides a good estimate of the capillary and absorptive retention of water by the cellulose solids by removing the interstitial water from the cake solids. The procedure is quick (5 to 10 minutes) and highly reproducible. The water retention value of MDC is characteristically at least 350%, and preferably at least 500%.

Viscosity may also be used as a characterizing property of MDC. Apparent viscosities of an aqueous dispersions of 1.5% w/w MDC solids samples were determined with a Brookfield Viscometer model DV-III using spindle SC4-16 with the small cell adapter at a number of shear conditions (5 through 100 RPM). The samples were pre-dispersed by high speed mixing for three minutes at 10,000 RPM with a rotor stator type mixer (Omni International, model 1000). The viscosities measured for final refined product (MDC) of the three examples are shown in Table 1. The softwood fiber product exhibited a viscosity of approximately 8,000 centipoise at a spindle speed of 100 RPM. The white wheat fiber product had a viscosity of approximately 6,000 and the oat fiber a viscosity of approximately 1,300 at the same measurement conditions as for the softwood fiber. It appears the wide range in the measured viscosities is primarily due to the differences in fibril length and other ultrastructural characteristics of the starting materials.

It should be understood that the above viscosity measurements on MDC dispersions are made on a heterogeneous mixture (an interacting particle ensemble suspended in a fluid medium). Viscosity measurement is normally applied to homogenous systems. Because of the heterogeneous nature of the mixture a certain degree of mechanical distortion occurs in the mixture around the rotating spindle used to determine shear stress forces within the mixture. Consequently shear/shear stress measurements are time and history dependent. As such the measurement is not a true viscosity in the conventional sense but rather provides a reproducible measurement that has been found useful for characterizing the degree of microdenomination and in describing the implementation of this invention.

According to a preferred embodiment, two substances have been found to produce a synergistic effect when used in combination as a dispersion agent in the practice of this invention. The substances are maltodextrin and carboxymethylcellulose (CMC), which need only be added in modest quantities relative to the weight of the MDC. The preferred amount of the maltodextrin is about one-half to one and one-half the weight of the MDC while the preferred amount of the CMC is about 5% to about 15% the weight of the MDC.

Maltodextrins are short chain oligiosaccharides reduced by the controlled hydrolysis of starch. The degree of polymerization (DP) of maltodextrins is typically less than thirty and higher than five. Commercial maltodextrins are excellent film formers and display low viscosity aqueous solutions at relatively high solids levels, typically 10 to 30%. They are readily available in food grades at reasonable cost.

CMC is a random ether substituted homopolymer of glucose produced by reaction of alkaline cellulose with chloroacetic acid. It also is food approved and readily available at relatively low cost. CMC has long been employed as a dispersant for cellulose slurries in the pulp and paper industry. It has been used as a drying additive for redispersion of microcrystalline cellulose and in drying of other, refined high surface area cellulose products. CMC (and other random substituted cellulose ethers) are believed to have regions of low to no substitution which have relatively high affinity for certain surface orientation of their particulate counterpart, the unsubstituted beta-glucan chain ensemble constituting refined cellulose. In the case of CMC for which each carboxymethyl substituent bears a stationary negative charge at a pH greater than 3.5, the binding of this substituted oligiosaccharide to a cellulosic surface would impart substantial stationary charge and negative zeta potential. Although not intending to be bound by any particular mechanism of operation, it is believed that such surface potential tends to retard collapse of structure on drying and interfere with interparticle hydrogen binding as well as to enhance dispersement of particle structure in a continuous, polar phase such as water.

Although the mechanism by which maltodextrin and CMC act synergistically to keep the fibrils from bonding firmly together during drying has yet to be fully elucidated, it is believed to involve cooperative interaction, of sorts, between the two substances. The maltodextrin is believed to provide a glass-like matrix that encases the cellulose fibrils while the CMC apparently binds to the fibril surfaces sufficiently to retard collapse to the point that enough water is removed to solidify the entrapping matrix. The two substances in combination are very effective in prohibiting irreversible collapse of MDC during drying, thus allowing rapid dehydration and dispersement to occur and preserving to a substantial extent the favorable properties exhibited by never dried MDC.

The dispersion agent may optionally include lecithin in an amount from 0.1% to about 10% based on the weight of the MDC.

The following examples are provided to describe in further detail the preparation of MDC in accordance with the present invention. These examples are intended to illustrate and not to limit the invention.

EXAMPLE 1

Never dried white wheat fiber was mixed with 2,190 gallons of water in a hydrobeater (Black Clawson Model 4-SD-4 with Driver No. 45) to make up a pulp of 4.5% w/w solids, The white wheat fiber used in this example is a commercially available refined fiber product derived from bleached wheat chaff obtained from Watson Foods Company, West Haven Conn. The white wheat product was obtained as a nominal 40% w/w nonvolatile solids fiber mat. The product was stated to be 98% total dietary fiber by the Prosky method. The particle size by microscopic examination indicated a largely heterogeneous population of thin needle-like sclerchyma cells ranging in major/minor dimensions of 500 to 1000/10 to 20 microns with few interspersed parenchyma cells of 200/50 microns.

After beating the pulp for twenty minutes at room temperature it was transferred to a water jacketed holding tank to be repeatedly passed through a Black Clawson Twin Hydradisc refiner. The refiner of this example is a twenty-eight inch diameter double disc unit powered by a 250 horsepower motor. The refiner plates mounted on the discs are made of sharloy (a nickel hardened steel). The refiner plates were not equipped with dams. The faces of the particular refiner plates used in this refiner consists of alternate bars and grooves oriented so that bars of the adjacent refiner plates (one static and the other revolving) move relative to one another with a scissoring action occurring as the bars of each confronting plate move past one another. The three critical dimensions of these bars and grooves are the bar width, channel width and channel depth. For this particular unit, they were, respectively, $2/16$ of an inch, $4/16$ of an inch and $3/16$ of an inch (expressed as 2,4,3 by Black Clawson's convention).

The refiner plates on the revolving disc move at 713 revolutions per minute. Based on the outer periphery of the refiner disc extending to 13 and ¼ inches from the centerline of the drive shaft, this corresponds to peripheral speed of about 4,900 feet per minute. The pulp was continuously circulated at a rate of approximately 250 gallons per minute through the refiner and back to the holding tank. Passage of the cellulose suspension through the refiner occurs so as to have equal flow on each side of the revolving disc.

One disc of the refiner is fixed while the other is sliding. This allows the distance between adjacent discs to be adjusted. In the full open position (typical of startup or shutdown), discs are one and three-quarters inch apart. During refining, the discs are of the order of one to two thousands of an inch apart. Rather than adjust the gap between discs to a specific spacing, the value of the amperage to the motor driving the refiner is used to establish spacing. The procedure upon startup is to move the discs from the full open position to a closer position where the amperage reading increases until it reaches 310 amps. At this point, maximum power is being delivered from the motor. Once this point is reached, the back pressure on the refiner is increased by closing down the valve on the line returning pulp from the refiner to the holding tank. The back pressure is normally raised from an initial value of about 14 psig to a final value of about 35 psig. As the back pressure is increased without adjustment of the sliding disc location, the amperage drawn by the motor decreases to about 260 amps. With the back pressure at 35 psig, the sliding disc is adjusted to bring the discs closer together until the desired 310 amps are drawn by the motor. Once this is done, there is no further adjustment of the sliding disc unless the motor amperage drops significantly. This may occur as refining proceeds if certain properties of the pulp change significantly. In that event, the sliding disc is moved to reduce the gap between the discs until either the desired amperage is once again achieved, or the discs begin to squeal. Squealing is to be avoided as it is indicative of excessive disc wear and leads to high refiner plate replacement costs.

A gate-type mixer in the holding tank continuously mixed the contents during refining. A back pressure of 34 pounds per square inch was maintained in the return line from the refiner outlet to the holding tank. The recycle operation continued for approximately six hours during which the Canadian Standard Freeness of the pulp changed from an initial value of 190 to a final "false" value of 780 ml.

During refining the temperature of the pulp increased from an initial value of 64 to a final value of 190 degrees Fahrenheit. The amperage drawn by the 250 horsepower motor of the refiner varied from 310 initially to 290 amperes at completion of refining. Energy input to the refiner was approximately 1.2 kilowatt-hours per pound of refined fiber processed (dry weight basis).

The following examples illustrate the teachings of the invention.

EXAMPLE 2

A typical high alpha-cellulose content cellulose from wheat was refined to a Canadian Standard Freeness of 790 according to the procedure described in Example 1, above, mixed with dispersion agent and dried in a 25 square foot Buflovak double drum dryer (two 24-inch diameter, 24-inch width drums). The resultant mixture on a dry basis consisted of 56% w/w MDC, 39% w/w maltodextrin obtained from Staley, Decatur, IA (Lodex-15), 4% w/w carboxymethylcellulose type HP-5HS obtained from Dai-Ichikoyyo Seiyaku Company Ltd., Japan and 1% w/w soy lecithin obtained from Cargill, Decatur Ill. This mixture was then fed as an aqueous dispersion of 4.55% total solids at a rate of 414 pounds per hour to a double drum dryer to produce a dried product of 93.3% solids. The drums revolving at five revolutions per minute were heated by 100 psig steam. The nip thickness on both drums was set at 0.01 inches. Dried product was removed as a thin continuous film from the drums and subsequently ground to flake and powdered products.

Both the flake and powdered products were redispersed in water and the viscosity measured for comparison with the original MDC. All viscosities were measured in an aqueous dispersion at 1.5% w/w MDC solids and the additive concentrations noted above in a Brookfield Viscometer model DV-III with the small cell adapter using spindle SC4-16 at shear stresses imposed by a range of rotational speeds from 5 to 100 revolutions per minute (rpm). The viscosity of the aqueous dispersion of MDC with added dispersion agent before drying was 5,520 centipoise at 5 rpm. The 5 rpm viscosities of the dried flake and powdered products after drying and aqueous redispersion at the same solids content as the original dispersion with a Hamilton Beach Scovill Mixer model 936 ZSA at 2 minute (medium speed) were 3,410 and 3,095 centipoise, respectively. The complete viscosity/shear profiles for these three aqueous dispersions are shown in Table 1. The viscosity of the same powdered product after high shear redispersion for three minutes at 10,000 rpm with a Omni Digi-system rotostator type mixer (20 mm. generator) was 3,265 centipoise.

TABLE 1

| Spindle RPM | VISCOSITIES OF 1.5% W/W MDC AQUEOUS DISPERSIONS (cp) | | | | | | | | | |
|---|---|---|---|---|---|---|---|---|---|---|
| | 5 | 10 | 20 | 50 | 100 | 100 | 50 | 20 | 10 | 5 |
| Before Drying | 5520 | 2990 | 1940 | 1010 | 730 | 760 | 1350 | 2500 | 3600 | 5220 |
| From Flake | 3410 | 2190 | 1590 | 850 | 590 | 600 | 920 | 1760 | 2570 | 3570 |
| From Powder | 3095 | 1770 | 1390 | 880 | 590 | 590 | 900 | 1790 | 2530 | 3450 |

EXAMPLE 3

Never dried wheat fiber MDC refined to a false value of Canadian Standard Freeness of 780, according to the procedure described in Example 1, above, was mixed with dispersion agent and dried on a two foot wide by 100 foot long belt dryer. The resultant mixture on a dry basis consisted of 64.1% w/w MDC, 32.0% w/w maltodextrin, 3.2% w/w carboxymethylcellulose (CMC) and 0.7% w/w lecithin. The feed at a total solids content of 7.25% in an aqueous dispersion was fed at a rate of 917 pounds per hour to the dryer and dried to a solids content of 90% solids. The belt speed was 59 feet per minute and the nip thickness at the applicator bar was set at 0.026 inches. A sixty foot length of the belt was heated by 50 psig. steam. Dried product was removed as a thin continuous film and subsequently ground to flake and powdered products.

Film, flake and powdered products were redispersed in water and the viscosity measured for comparison with the original MDC as in EXAMPLE 1. The 5 rpm viscosity of the original MDC was 5,640 centipoise. The 5 rpm viscosities of the film, flake and powdered products after redispersion with a Hamilton Beach Mixer were 4,320, 3,775 and 3,410 centipoise, respectively. The viscosity/shear profiles for there four aqueous dispersions are set forth in Table 2.

TABLE 2

| | VISCOSITIES OF 1.5% W/W MDC AQUEOUS DISPERSIONS (cp) | | | | | | | | |
|---|---|---|---|---|---|---|---|---|---|
| Spindle RPM | 5 | 10 | 20 | 50 | 100 | 100 | 50 | 20 | 10 | 5 |
| Before Drying | 5640 | | | | 580 | | | | |
| From Film | 4320 | | | | 605 | | | | |
| From Flake | 3775 | | | | 595 | | | | |
| From Powder | 3410 | | | | 580 | | | | |

While certain preferred embodiments of the present invention have been described and exemplified above, it is not intended to limit the invention to such embodiments, but various modifications may be made thereto, without departing from the scope and spirit of the present invention as set forth in the following claims.

What is claimed is:

1. A process for preparing dry, redispersible microdenominated cellulose comprising microdenominated cellulose prepared by repeatedly passing a liquid suspension of cellulose through a zone of high shear, said zone being defined by two confronting surfaces, with one of said surfaces rotating relative to the other, until said cellulose suspension is rendered substantially stable and has a Canadian Standard Freeness that consistently increases with repeated passage through said zone of high shear, said microdenominated cellulose having a settled volume of greater than 50% as determined on the basis of a 1.0% by weight suspension in water after twenty-four hours and drying said suspension of microdenominated cellulose in the presence of a dispersion agent in an amount effective to impart to said dry microdenominated cellulose a viscosity, when dispersed in water, of at least 50% of the viscosity of an equivalent concentration of never dried microdenominated cellulose dispersed in water.

2. A process according to claim 1 wherein said dispersion agent comprises maltodextrin and carboxymethylcellulose (CMC), the amount of said maltodextrin being about one-half to 1.5 times the weight of said microdenominated cellulose and the amount of said CMC being about of 5% to 15% of said weight of the microdenominated cellulose.

3. A process according to claim 1 wherein said suspension is dried as a substantially continuous film on a heated, moving belt dryer.

4. A process according to claim 1 wherein said suspension is dried as a substantially continuous film on a heated, double drum dryer.

5. A process according to claim 1 wherein lecithin is included in said dispersion agent in an amount from 0.1 to about 10% based on the weight of the microdenominated cellulose contained therein.

6. A composition comprising dry, microdenominated cellulose, said microdenominated cellulose being prepared by repeatedly passing a liquid suspension of fibrous cellulose through a zone of high shear, said zone being defined by two confronting surfaces, with one of said surfaces rotating relative to the other, until said cellulose suspension is rendered substantially stable and has a Canadian Standard Freeness that consistently increases with repeated passage through said zone of high shear, said microdenominated cellulose having a settled volume of greater than 50%, as determined on the basis of a 1.0% by weight suspension in water after twenty four hours and a water retention value greater than 500% and at least two dispersing agents, said dispersing agent consisting essentially of a first material selected from the group consisting of maltodextrins, complex polysaccharides, simple sugars and common edible disaccharides in an amount sufficient to form continuous encapsulating matrices on drying and a second material selected from the group consisting of CMC, locust bean gum, xanthan gum and guar gum in an amount sufficient to provide deflocculating or repellant barriers between adjacent fibril surfaces, said amounts being effective to impart to said dry microdenominated cellulose a viscosity, when re-dispersed in water, of at least 50% of the viscosity of an equivalent concentration of never dried microdenominated cellulose dispersed in water.

7. A composition as claimed in claim 6, wherein said dispersing agent of the first type is maltodextrin and the dispersing agent of the second type is carboxymethylcellulose.

8. A composition according to claim 7 wherein the amount of said dispensing agent of the first type is in the range of about 50% to about 150% by weight of the microdenominated cellulose.

9. A composition according to claim 7 wherein the amount of said dispersing agent of the second type is in the range of about 5% to about 15% by weight of the microdenominated cellulose.

10. A composition comprising dry, microdenominated cellulose, said microdenominated cellulose being prepared by repeatedly passing a liquid suspension of fibrous cellulose through a zone of high shear, said zone being defined by two confronting surfaces, with one of said surfaces rotating relative to the other, until said cellulose suspension is rendered substantially stable and has a Canadian Standard Freeness that consistently increases with repeated passage through said zone of high shear, said microdenominated cellulose having a settled volume of greater than 50%, as determined on the basis of a 1.0% by weight suspension in water after twenty four hours and a water retention value greater than 500% and a dispersion agent comprising maltodextrin and carboxymethylcellulose (CMC), the amount of said maltodextrin being about one-half to 1.5 times the weight of said microdenominated cellulose and the amount of said CMC about 5% to 15% of the weight of the microdenominated cellulose.

* * * * *